United States Patent
Perlmutter

[11] 3,934,797
[45] Jan. 27, 1976

[54] INDIVIDUAL ROOM TEMPERATURE CONTROL SYSTEM

[76] Inventor: Neal Robert Perlmutter, 7324 A Mill Run Apts., Fort Wayne, Ind. 46819

[22] Filed: May 28, 1974

[21] Appl. No.: 473,497

[52] U.S. Cl. ............... 236/46; 236/1 B; 236/49
[51] Int. Cl.² ........................... F24F 11/06
[58] Field of Search ............ 236/49, 47, 46, 1 B

[56] References Cited
UNITED STATES PATENTS

| | | | |
|---|---|---|---|
| 2,950,056 | 8/1960 | Baker | 236/49 |
| 3,814,312 | 6/1974 | Gerhauser et al. | 236/49 |

*Primary Examiner*—William E. Wayner
*Attorney, Agent, or Firm*—Albert L. Jeffers; Roger M. Rickert

[57] ABSTRACT

A temperature control system for individual rooms within a home is disclosed having a pair of thermostatically controlled switches settable to "occupied" and "unoccupied" temperatures respectively with a clock controlled switching arrangement for determining which thermostatically controlled switch is effective during predetermined hours of the day. The clock selected thermostatically controlled switch is coupled by way of a relay to control a forced air duct opening and closing louver arrangement so that the duct may be opened for either heating or cooling during unoccupied periods of time a lesser percentage than it is opened during periods of the day when the room is typically occupied.

7 Claims, 7 Drawing Figures

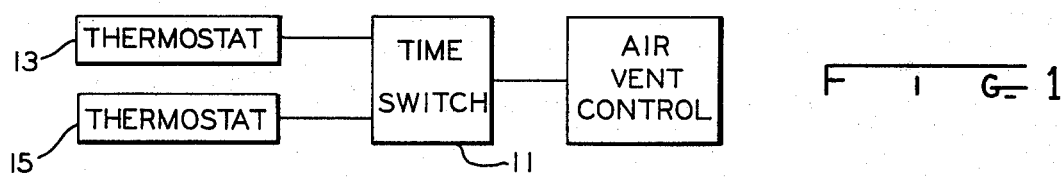
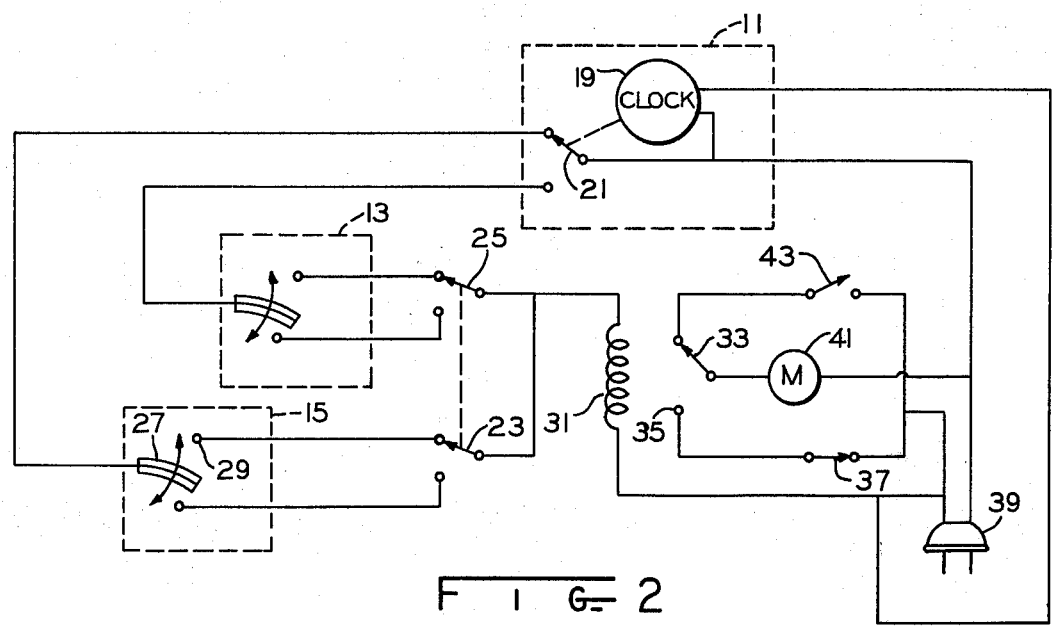
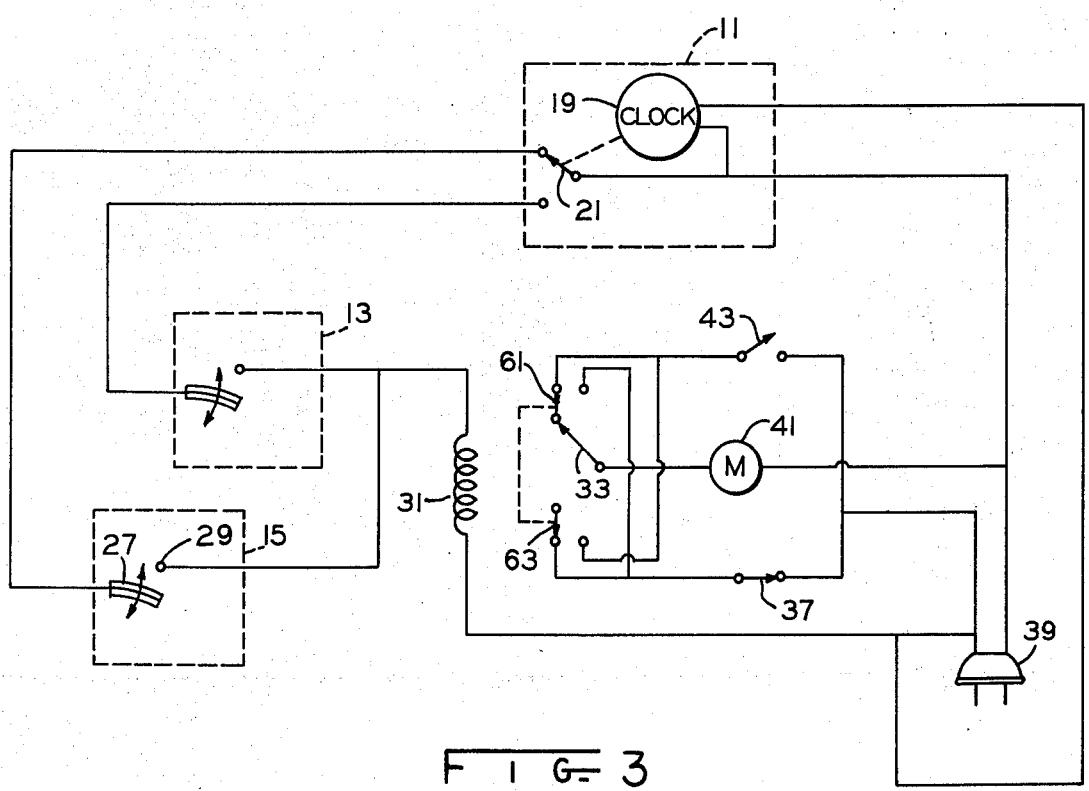

INDIVIDUAL ROOM TEMPERATURE CONTROL SYSTEM

BACKGROUND OF THE INVENTION

The present invention relates to the thermostatic control of heating and/or cooling of individual areas which are typically occupied during certain hours of the day and unused during other hours of the day and more particularly to the clock controlled selection of different thermostat settings appropriate to the particular room for a particular time period thereby eliminating the waste of energy normally associated with maintaining unoccupied areas at the temperature desired when those areas are occupied.

In the prior art, it is known to control the main or central heating source in a home with a single clock controlled thermostatic system and it is known to provide a time delay thermostatic system which may be applied to either a main heating source or to individual radiators as illustrated in U.S. Pat. No. 1,883,735 to Hall. It is also known to provide custom built heating and ventilating units for individual rooms including individual time and thermostat combination control as illustrated by U.S. Pat. No. 2,969,652 to Blanchard. Another custom built heating and air conditioning system employing time and temperature control is illustrated by U.S. Pat. No. 2,290,757 to Lawler.

The prior art either provides a single temperature control for the entire home or custom built system which would typically be installed in a home as original equipment and nowhere teaches individual autonomous control for individual rooms.

It is accordingly one object of the present invention to provide timed temperature control for individual rooms within a home.

Another object of the present invention is to provide both heating and cooling control for homes equipped with central air conditioning.

A further object of the present invention is to provide an individual timed temperature control unit which may be selectively installed in one or more rooms as desired without modification of the central heating unit.

A general object of the present invention is to reduce energy waste due to either heating or cooling unoccupied areas.

SUMMARY OF THE INVENTION

The foregoing as well as numerous other objects and advantages of the present invention are achieved by providing a temperature control system for an individual room of a home where the room is heated or cooled by air from a forced air duct connected to a central unit comprising a pair of thermostatically controlled switches individually settable to selected temperatures with electrically controllable means for selectively opening and closing the duct and clock controlled switch means for connecting a selected one of the thermostatically controlled switches to the electrically controllable means during a first predetermined time interval and the other of the thermostatically controlled switches to the electrically controllable means during a second predetermined time interval to reduce energy dissipation from the room during periods it is typically unoccupied.

The subject matter which I regard as my invention is particularly pointed out and distinctly claimed in the concluding portion of this specification. My invention itself, however, with further objects and advantages thereof may best be understood by reference to the following description taken in conjunction with the accompanying drawing.

BRIEF DESCRIPTION OF THE DRAWING

FIG. 1 is a block diagram of an individual room temperature control system;

FIG. 2 is a schematic diagram of a circuit implementing the functions set forth in FIG. 1;

FIG. 3 is a schematic diagram of an electrical circuit similar to that of FIG. 2 but illustrating an alternate method for changing from a heating to a cooling mode;

DESCRIPTION OF THE PREFERRED EMBODIMENT

Figure 4:
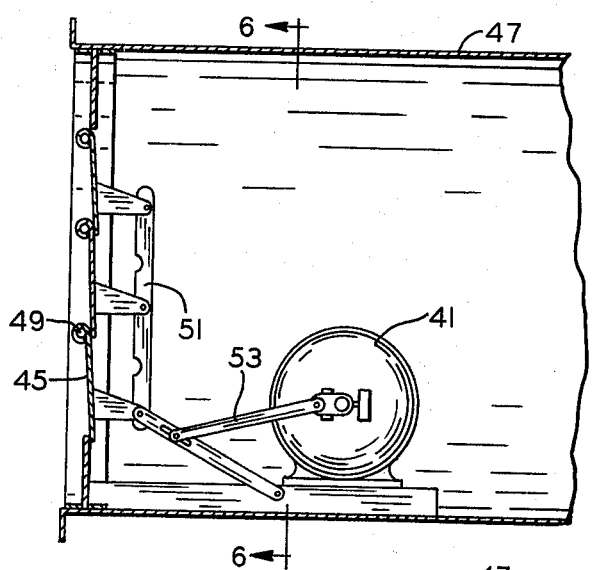
FIG. 4 is a side view of the mechanical portions of the air vent control of FIG. 1.

In FIG. 1 a clock controlled switching device 11 determines which of the two thermostatically controlled switches 13 or 15 is effective control the air vent control system 17. For example, if the system of FIG. 1 were to be installed in a living room, thermostat 13 might be set to 72° Fahrenheit with thermostat 15 set to 63° Fahrenheit and the time switch 11 arranged to allow thermostat 13 to control the air vent system during the hours of typical usage of the living room such as 6:00 p.m. to 11:00 p.m. at which time the switch 11 would transfer control to thermostat 15 lowering the living room temperature for the remainder of the night and during the daylight hours. The times and temperatures would, of course, be selected by the user to best suit his own needs. A detailed circuit for implementing the functions of FIG. 1 is set forth in FIG. 2 with like reference numerals identifying the same or similar elements.

In FIG. 2 an electric clock mechanism 19 is mechanically coupled to a double-pole single-throw switch 21 to change that switch from one pole to the other at times preset on the clock 19 and the time switch may, for example, be implemented by simply adding a second contact in the existing switch mechanism of the clock unit of commercially available clock radios.

With the switch 21 in the position shown, the thermostat 15 is active to control the system while the thermostat 13 is inactive. The ganged switch 23, 25 functions as a mode switch and is switchable between the heating mode position illustrated and a cooling mode where each line is coupled to different contacts within the thermostat. In the position shown for the heating mode of operation and with thermostat 15 being enabled by the clock mechanism 11 as the room cools, the bimetallic strip 27 will straighten moving upwardly and eventually contact terminal 29 indicating to the air vent control that additional warm air is needed by energizing the actuating circuit or coil 31 of double-pole single-throw relay. When a current passes through the relay coil 31, the armature 33 thereof is pulled from the position illustrated so as to contact terminal 35 which by way of normally closed switch 37 will supply electrical energy from a power source such as plug 39 to an electric motor 41. The switches 37 and 43 are not user controlled but rather their status is determined by the position of certain louvers 45 in the forced air duct and will be better understood by brief reference to FIGS. 4 through 7.

Figure 5:
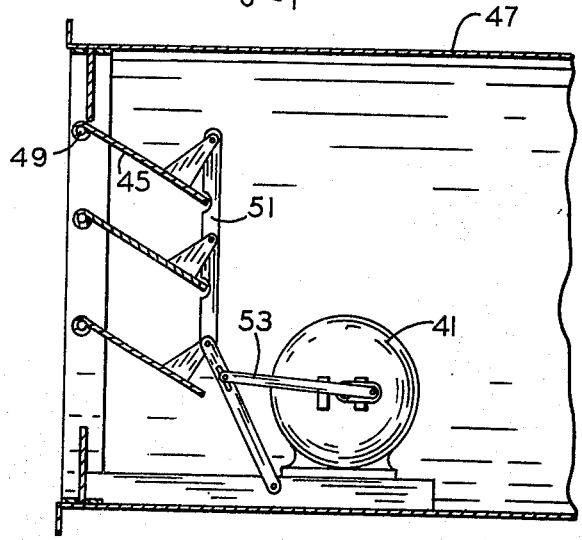
FIG. 5 is a side view similar to FIG. 4 but illustrating the vent in its open position.
Figure 6:
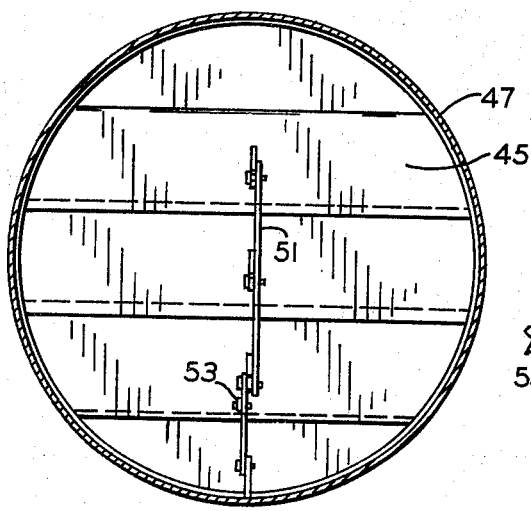
FIG. 6 is an end view of the vent closing louvers and connecting links of FIGS. 4 and 5 in the duct closing position.
Figure 7:
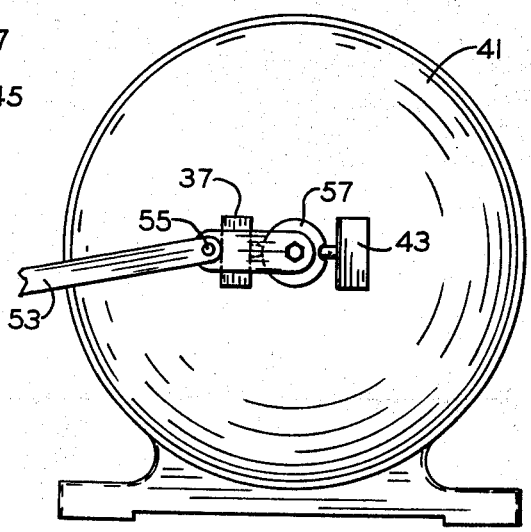
FIG. 7 is an end view of the motor of FIGS. 4 and 5 illustrating in greater detail the eccentric arm and cam which operatively engages a pair of normally closed switches.

An exemplary forced air duct 47 connected to a central heating or cooling unit (not shown) has a series of louvers 45 which may be mechanically moved between the air blocking position illustrated in FIG. 4 and the air passing position illustrated in FIG. 5. Each louver 45 is hinged to a framework by hinges 49 and the entire set of louvers 45 is connected together by linkage 51 for simultaneous parallel opening and closing of the louvers. An arm 53 is eccentrically connected to the motor 41 at eccentric pivot point 55 and hence energization of the motor 41 will cause the pivot point to execute a circular motion about the motor axis moving the eccentric arm 53 back and forth cyclically opening and closing the forced air duct. Switches 37 and 43 operatively engage a cam 57 with switch 37 closed and switch 43 open when the cam 57 is in the position illustrated in FIG. 7. This, of course, corresponds to the condition where the air duct is closed and the status of the switches 37 and 43 in FIG. 7 is the same as that illustrated in FIG. 2.

Returning now to FIG. 2, when the thermostat calls for additional heat energizing the relay coil 31, the motor 41 was energized by way of the closed switch 37. As soon as the motor 41 begins to rotate, the cam 57 of FIG. 7 will place both switches 37 and 43 in their normally closed position and the motor 41 will continue to rotate until the cam 57 has executed one-half revolution opening the switch 37 and de-energizing the motor. This situation, of course, corresponds to the louver open position illustrated in FIG. 5. The air duct will remain open until the thermostat 15 indicates that the room has reached the desired temperature level at which time thermostat 15 opens de-energizing relay coil 31 and causing the armature 33 thereof to return to the position illustrated in FIG. 2. Since the motor has executed one-half revolution, switch 43 is now closed with switch 37 in its open status and accordingly de-energization of the relay will again energize motor 41 this time by way of the closed switch 43 and cam 57 will execute another half revolution to the point where the cam opens switch 43 again de-energizing the motor this time with the louvers in the closed position illustrated in FIG. 4.

During another period of the day the time switch 11 may transfer control of the system to the thermostat 13 which, except for its different temperature setting, controls the heating of the room in the same manner as previously described.

The circuit of FIG. 2 may also function to open and close the same forced air duct during the summer for cooling purposes when that duct is conveying cool air from a central air conditioning unit. To change over to this cooling mode the ganged switch contacts 23 and 25 may be employed to couple the circuit to a second set of contacts in each of the thermostats so that the thermostats 13 and 15 are now effective to open the forced air duct only when the temperature within the room exceeds the temperature setting on the particular clock selected thermostat. As an alternative to providing two contacts in each thermostatic switch, single contact standard thermostatic switches may be employed in the manner illustrated in FIG. 3.

In FIG. 3, a pair of switch contacts 61 and 63 are ganged together for simultaneous operation and with the switch 61, 63 in the position illustrated, the circuit of FIG. 3 functions precisely as described for the circuit of FIG. 2 with its switch 23, 25 in the position there illustrated. In FIGS. 2 and 3 identical or similar elements bear like reference numerals.

If the switch 61, 63 is changed from the position illustrated, the effect is to change the relay from a normally closed relay to a normally open relay, that is when the relay coil 31 is not energized the armature 33 is still in its upper position, however, in that position the motor is connected to the source of electrical energy by way of switch 37.

To illustrate the function of the circuit of FIG. 3, assume that the switch 61, 63 is in its air conditioning mode, that is opposite the position illustrated in FIG. 3, and further assume that a room has been adequately cooled and the forced air duct is closed as illustrated in FIG. 4. Under those conditions switch 43 is open and switch 37 is closed and the thermostat 15 has its bimetallic strip 27 contacting the contact 29 since the temperature is below that set on the thermostat. Under these circumstances relay coil 31 is energized and the armature 33 is in its down position opposite that illustrated, however, the motor is not energized since switch 43 is open preventing current flow to the motor through the armature 33. As the room warms the bimetallic strip 27 bends opening the contact 29 de-energizing the relay coil 31 and allowing the relay armature 33 to return to its up position at which time the motor 41 may be energized by way of closed switch 37. The motor revolves its cam 57 through one-half revolution until the switch 37 opens stopping the motor and leaving the louvers 45 in the open position illustrated in FIG. 5.

After sufficient cool air has been pumped into the room the bimetallic strip 27 will again contact terminal 29 energizing the relay coil 31 and pulling armature 33 downward which again energizes motor 41 this time by way of closed switch 43 to again close the duct lowering the load on the central air conditioning system.

Thus, while the present invention has been described with respect to a specific embodiment which is economical and may be easily installed in selected individual rooms, numerous modifications will suggest themselves to those of ordinary skill in the art. For example, the mode switches for changing from a heating to a cooling mode may be relays interconnected with a central heating-air conditioning unit and, of course, other schemes for opening and closing the forced air duct may be devised. These and other modifications will readily suggest themselves to those of ordinary skill in the art and accordingly the scope of the present invention is to be measured only by that of the appended claims.

I claim:

1. A temperature control system for an individual room of a home or similar air which is typically occupied during certain hours of the day and unused during other hours of the day and which receives air from a forced air duct connecting to a central unit comprising:
  a pair of thermostatically controlled switches each changing state at an individually selectable temperature;

electrically controllable means for selectively opening and closing the duct including means in the air duct mechanically movable between air passing and air blocking positions, electrically energizable means for moving the mechanically movable means cyclically between the air passing and air blocking positions so long as the electrically energizable means is energized, and a pair of normally closed switches one of which opens only when the mechanically movable means is in the air passing position and the other of which opens only when the mechanically movable means is in the air blocking position with each normally closed switch being coupled to the electrically energizable means to tentatively stop the mechanically movable means when one of the normally closed switches opens; and means for selectively connecting one of the thermostatically controlled switches to the electrically controllable means.

2. The temperature control system of claim 1 wherein the means for selectively connecting comprises clock controlled switch means for selectively connecting one of the thermostatically controlled switches to the electrically controllable means during a first predetermined time period and the other of the thermostatically controlled switches to the electrically controllable means during a second predetermined time period.

3. The temperature control system of claim 2 wherein the electrically controllable means further comprises a double-pole single-throw relay having an actuating circuit coupled by the clock selected thermostatic switch to a source of electrical energy, the relay tentatively forming alternate series circuits each by way of one of the normally closed switches to supply energy to the electrically energizable means.

4. The temperature control system of claim 3 wherein each change in the status of the clock selected thermostatic switch causes a corresponding change in the relay status thereby selecting a different normally closed switch to supply energy to the electrically energizable means.

5. The temperature control system of claim 1 wherein the electrically energizable means comprises an electric motor, an eccentric arm driven by the motor and coupled to the mechanically movable means, and a cam driven by the motor and operatively engaging the normally closed switches.

6. The temperature control system of claim 1 wherein the electrically controllable means comprises a plurality of hinged louvers, linkage means connecting the louvers together for simultaneous parallel opening and closing of the louvers, and electrically energizable means responsive to a thermostatically controlled switch for moving the louvers between air passing and air blocking positions within the forced air duct.

7. The temperature control system of claim 1 wherein the central unit is a combination heating and cooling unit, the electrically controllable means including a mode switch switchable between heating and cooling modes for opening the ducts when the temperature is below a desired level in the heating mode and for closing the duct when the temperature is below a desired level in the cooling mode.

* * * * *

UNITED STATES PATENT OFFICE
CERTIFICATE OF CORRECTION

Patent No. 3,934,797   Dated January 27, 1976

Inventor(s) Neal Robert Perlmutter

It is certified that error appears in the above-identified patent and that said Letters Patent are hereby corrected as shown below:

Claim 1, line 2, "air" should be -- area --.

Signed and Sealed this twentieth Day of April 1976

[SEAL]

Attest:

RUTH C. MASON
Attesting Officer

C. MARSHALL DANN
Commissioner of Patents and Trademarks